Oct. 10, 1967  D. C. HINGS  3,346,144
APPARATUS FOR DISPENSING AND MIXING LIQUIDS
IN PREDETERMINED RELATIVE PROPORTIONS
Filed Oct. 26, 1965  3 Sheets-Sheet 1
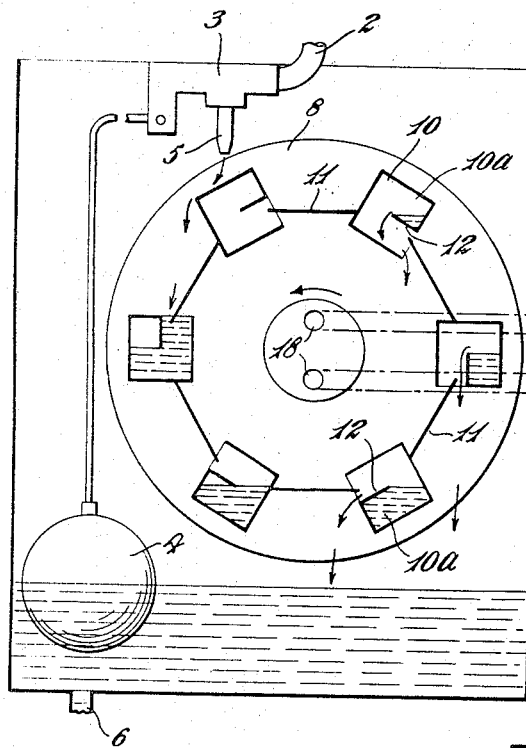
Fig. 1.
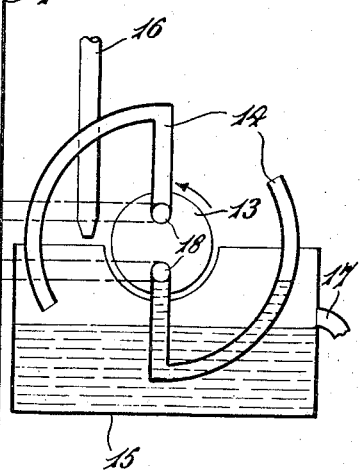
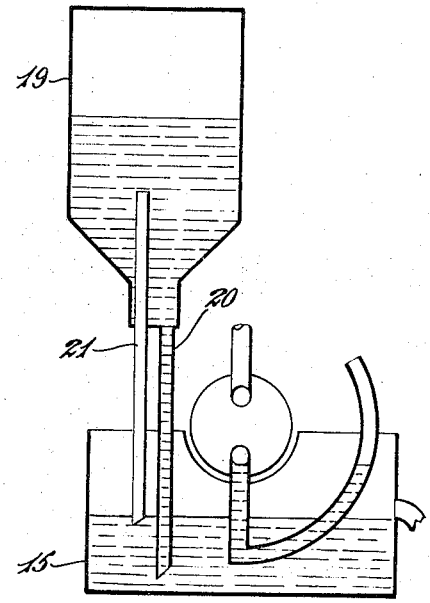
Fig. 2.
Fig. 3.

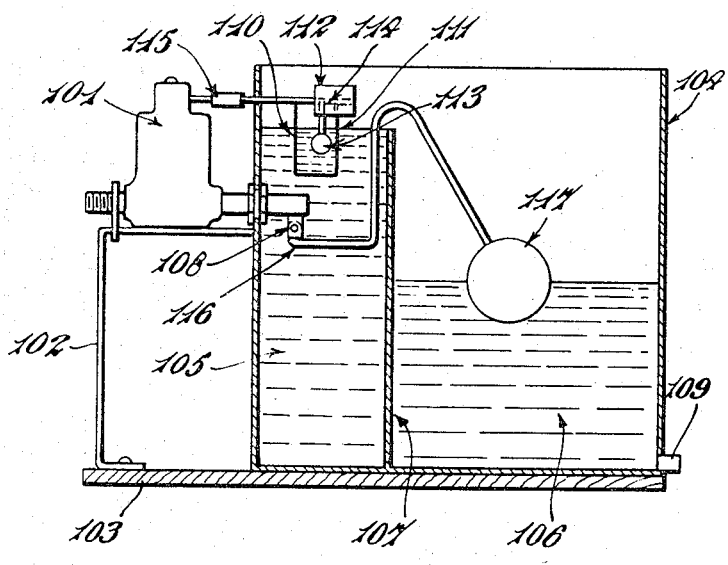
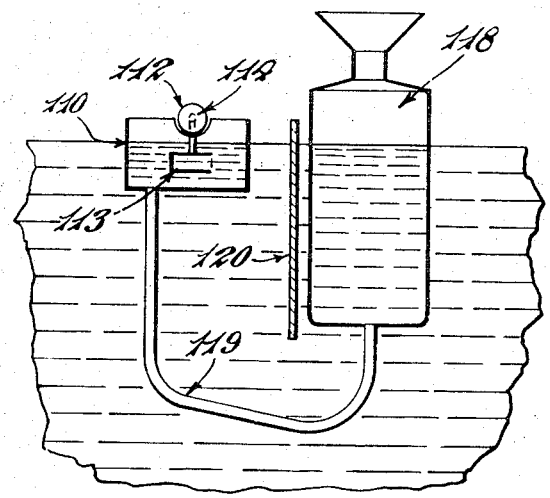

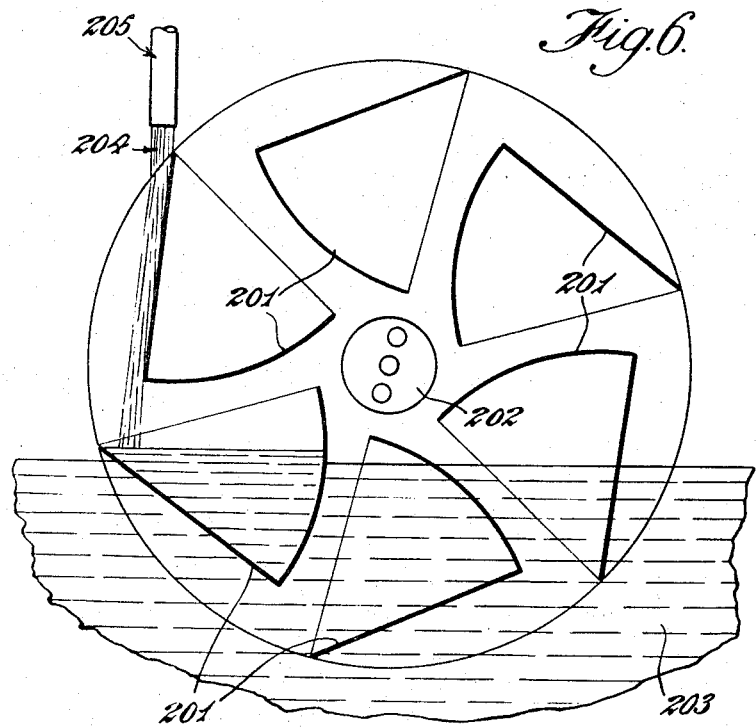

3,346,144
APPARATUS FOR DISPENSING AND MIXING LIQUIDS IN PREDETERMINED RELATIVE PROPORTIONS

David C. Hings, Woodford Green, England, assignor to Whitmoyer-Reed Limited, Barking, Essex, England, a British company
Filed Oct. 26, 1965, Ser. No. 505,286
Claims priority, application Great Britain, Nov. 28, 1964, 43,905/64; May 11, 1965, 19,769/65
4 Claims. (Cl. 222—57)

The invention is concerned with an apparatus for dispensing and mixing liquids in predetermined relative proportions and is particularly but not exclusively concerned with apparatus suitable for dispensing and mixing a carrier liquid and a liquid, such as a germicide, which will form the active ingredient of the final mixture.

The apparatus of the invention is of particular utility in that it can be constructed without pistons and shaft seals and the number of valves required is the minimum. For this reason the device is especially adapted for field use, e.g., for dispensing germicides, under conditions such as prevail in the agricultural field in which dirty conditions are necessarily encountered.

The invention provides apparatus for dispensing and mixing liquids comprising a metering device for feeding a first liquid into a first reservoir, a scoop device operable in response to means for determining the amount of the first liquid fed, for feeding a predetermined relative proportion, with respect to the amount of the first liquid fed, of a second liquid from a second reservoir into the first reservoir, and means for maintaining a substantially constant liquid level in each reservoir.

The first metering device, particularly in cases where a supply of the first liquid is readily available, for example when the first liquid is water, can be any conventional water meter but it is conveniently a magnetically coupled meter such as that marketed by Tylors (Division of Crane) Ltd. of Bright Works, Burgess Hill, Sussex, under the code number DM63.

The scoop device will normally be the one which dispenses the liquid which forms the active ingredient in the final mixture. It may be convenient to provide an operable connection between the first metering device and the scoop device for example in the form of a drive shaft which may for example be coupled to a water meter at a suitable point in the gearing between meter and indicator, which will rotate in response to operation of the first metering device and, in turn, operate the scoop device, this operable connection providing the means for determining the amount of the first liquid fed to the reservoir.

In another preferred embodiment the first metering device comprises a drive member in the form of a wheel mounted within the first reservoir and carrying a plurality of containers adapted to (a) trap incoming carrier liquid thereby resulting in rotation of the drive member and (b) subsequently discharge carrier liquid into the reservoir. The aforesaid containers may be a series of cups mounted on the wheel and so controlled as to trap (during downward movement thereof) and subsequently discharge (during upward movement thereof) carrier liquid as the wheel rotates; in this arrangement baffles will usually be provided to ensure that all incoming liquid is directed towards and trapped by the containers.

In accordance with a preferred embodiment of the invention, there is provided dispensing and mixing apparatus which comprises a first reservoir for the mixed liquids and which has an outlet for the widthdrawal of mixed liquids and a controlled inlet for carrier liquid adapted to maintain a constant quantity of carrier liquid in said first reservoir, a second reservoir for said second liquid, a drive member adapted to be rotated by carrier liquid admitted into said first reservoir in a manner such that the number of rotations of the drive member is directly proportional to the amount of carrier liquid admitted into the first reservoir and a collecting and discharging device which is rotated by said drive member and which is adapted on each revolution thereof to collect from said second reservoir and discharge into said first reservoir a predetermined quantity of said second liquid.

In another preferred embodiment of the first metering device the container may be in the form of cups which are floatable in the liquid to be found in the first reservoir but which will sink when filled to a predetermined extent with first liquid. In this case the wheel on which the cups are carried will be mounted in the first reservoir with its hub at such a level with respect to the normal or desired liquid level in the first reservoir that the first liquid can be metered by the filling to a predetermined extent (determined by the buoyancy of the cups) of the cups with first liquid and mixed into the liquid in the first reservoir by the sinking of the cups when this extent has been reached. Such an arrangement can conveniently be fabricated in plastic coated metal although at least the rotating parts of the apparatus of the invention may conveniently be made entirely of plastic material, preferably one resistant to attack by corrosive liquids.

The second liquid will not usually be readily available from a constant source of supply, as is water, and so the second reservoir containing the second liquid, and from which the scoop device can draw its supply, is provided. Thus the scoop device may conveniently be a rotary scoop device. In order that the scoop will, as far as possible, always pick up the same amount of liquid from the second reservoir for delivery to the first reservoir it is obviously essential that the liquid level in the second reservoir be substantially constant. A number of conventional devices, for example a float-operated valve or inverted bottle device, can be provided for this purpose. One particularly convenient device for use when the first and second liquids have substantially the same density is to provide an open topped floatable bottle whose base is connected to a point below the desired liquid level in the second reservoir by a flexible tube and so site the second reservoir within the first that the desired liquid levels in the first and second reservoirs coincide and in use the bottle, in which a reserve supply of the second liquid is provided, will float in the mixture. Each scoop is preferably readily removable or interchangeable with a scoop of different size so that the proportion of second liquid mixed with the carrier liquid may be varied as desired.

The controlled inlet for admitting first liquid into the first reservoir for mixed liquids conveniently comprises a float-operated valve such as is conventionally employed in water cisterns.

Several embodiments of the apparatus of the invention are illustrated in the accompanying drawings in which:

FIGURE 1 is a diagrammatic view of a first embodiment showing the drive member and collecting device displaced;

FIGURE 2 is a sectional side view of the drive member and collecting device shown in FIGURE 1;

FIGURE 3 shows a modified arrangement for maintaining a constant level in the trough 15 shown in FIGURE 1;

FIGURE 4 is a diagrammatic representation of a longitudinal cross-sectional elevation of a further device according to the invention;

FIGURE 5 is a diagrammatic representation of a detail of part of the device illustrated in FIGURE 4 viewed from the right in FIGURE 4; and FIGURE 6 is a diagrammatic side view of a further embodiment of a drive member suitable for use in the apparatus of the invention.

Referring now to FIGURES 1 and 2 of the drawings, a rectangular reservoir 1 is provided with an inlet pipe 2, a valve 3 operated by a float 4, and a discharge orifice 5. An outlet 6 serves for the withdrawal, as desired, from reservoir 1. Inside reservoir 1 is mounted a wheel 8 mounted on a shaft 9 and carrying a series of containers in the form of cups 10 each having a baffle plate 11 and an inner partition 12 forming an inner cup 10a.

Shaft 9 also carries and drives a hub 13 having detachable scoops 14 which pick up liquid from a trough 15 supplied with liquid from pipe 16 and provided with an overflow pipe 17 serving to maintain a constant level in the trough. Each scoop 14 communicates with a passage 18 located in the hub 13 and discharging into reservoir 1. An alternative method of maintaining a constant liquid level in trough 15 is shown in FIG. 3. The arrangement shown in FIG. 3 involves an inverted bottle 19 having an outlet pipe 20 and an air tube 21 which prevents flow of water from the bottle when its outer end is covered by liquid which has reached the desired level in trough 15. The modification shown in FIG. 3 is particularly suitable where small dosages of the mixed liquids are required.

Assuming the carrier liquid is water and the second liquid is a germicide, the system shown in FIG. 1 operates as follows. Trough 15 is charged with germicide until the maximum level is achieved and water is admitted through inlet pipe 4 and orifice 5 until the float-operated valve 3 closes. The water from orifice 5 is directed, with the assistance of baffle plates 11, into each cup 10, the weight of water in the cup causing the wheel 8 to rotate. As the wheel turns the water is transferred to the inner cup 10a and is then lifted, after the cup passes bottom dead centre, and is discharged into reservoir 1. Operating in this matter it will be seen that the wheel 8 rotates by an amount directly proportional to the water discharged into the reservoir 1.

As wheel 8 rotates so also does the hub 13 carrying scoops 14 each of which picks up a predetermined quantity of germicide from the constant level trough 15. Liquid picked up by each scoop passes through passage 18 into reservoir 1 where it is mixed with water. The relative proportions of water and germicide mixed in reservoir 1 may be varied by varying the number and/or size of scoops 14.

Referring now to FIGURES 4 and 5, a water-meter 101 is supported by a bracket 102 on a base-plate 103 on which is also mounted a reservoir 104. The reservoir 104 is divided into two sections 105 and 106 by a lateral weir plate 107. An outlet 108 from the water-meter 101 extends into section 105 and an outlet 109 for the mixture from the reservoir 104 is provided from section 106.

A second reservoir 110 for liquid germicide is mounted in section 105 of reservoir 104. This second reservoir 110 is provided with a liquid metering device 111 comprising a hub 112 and detachable scoops 113 for picking up liquid from the reservoir 110 and delivering it through bores 114 to the liquid in section 105 of the reservoir 104. The hub 112 is driven, when the water-meter 101 is operating, through a drive shaft 115 operably connected between the hub 112 and a moving-part of the water-meter 101.

The outlet 108 from the water-meter is opened or closed as necessary by a valve 116 responsive to the position of a float 117 in section 106. This arrangement ensures that a substantially constant level of liquid is maintained in section 106 of the reservoir 104 and therefore that section 105 of the reservoir 104 is always full of liquid up to the top of the weir plate. The reservoir 110 is located so that the desired liquid level therein corresponds to the liquid level in section 105, that is to say, to the top of the weir plate.

To ensure that the liquid level in the reservoir 110 does not fall below the desired level a buoyant reserve tank 118 connected to the reservoir 110 by a flexible pipe 119 is maintained at least partly full of liquid germicide and floats in the mixture of section 105 of the reservoir 104. As the reserve tank 118 becomes empty of liquid it merely floats higher in the mixture and can readily be topped up. The reserve tank is located in section 105 behind a baffle plate 120.

The relative proportions of the two ingredients in the mixture can be varied at will by exchanging one or more of the scoops 113 for scoops of different capacity. The scoops are a push fit in the hub and are sealed therein by a resilient O-ring (not shown).

Referring now to FIGURE 6 there is shown therein a diagrammatic side sectional elevation of a modified first metering device. This comprises a plurality of cups 201 mounted on a hub 202. The cups 201 are buoyant in the liquid 203 in the first reservoir and the whole is so sited with respect to the liquid 203 that each cup in turn floats on the surface of the liquid 203 as it is filled by first liquid 204 from a controlled inlet 205. As each cup becomes full it then sinks emptying its contents into the first reservoir and rotating the hub 202. The cups 201 are so arranged that as one sinks the next catches the liquid 204 from the inlet 205. The hub, rotated by this action provides the shaft for driving the scoop device (not shown) in the same way as the corresponding hub 13 and the drive shaft 115 in FIGURES 1 to 3 and 4 and 5 hereinbefore described.

I claim:
1. An apparatus for dispensing and mixing liquids which comprises:
   (a) a first reservoir having an outlet and first and second inlets;
   (b) a metering device positioned and adapted for feeding a predetermined amount of first liquid from the first inlet into said first reservoir;
   (c) means for maintaining a substantially constant level of mixed liquids in said first reservoir;
   (d) a second reservoir being connected to said first reservoir by conduit means which terminate in the second inlet in said first reservoir;
   (e) a scoop device which operates in response to said metering device and is positioned and adapted within said second reservoir so as to be capable of transferring by way of said conduit means a predetermined amount of second liquid from said second reservoir into said first reservoir, which amount of liquid is directly proportional to the amount of first liquid fed into said first reservoir; and
   (f) an inverted bottle device for maintaining a substantially constant level of said second liquid in said second reservoir wherein said inverted bottle device comprises:
      (1) a pipe for delivering said second liquid from said inverted bottle which extends from the outlet of said inverted bottle to a point below the predetermined level of said second liquid in said second reservoir; and
      (2) an air tube effective for regulating the flow of said second liquid from said inverted bottle which extends from a point within the inverted bottle to the predetermined level of said second liquid in said second reservoir.

2. An apparatus for dispensing and mixing liquids which comprises:
   (a) a first reservoir having an outlet and first and second inlets;
   (b) a metering device positioned and adapted for feeding a predetermined amount of first liquid from the first inlet into said first reservoir;
   (c) means for maintaining a substantially constant level of mixed liquids in said first reservoir;
   (d) a second reservoir being connected to said first reservoir by conduit means which terminate in the second inlet in said first reservoir;

(e) a scoop device which operates in response to said metering device and is positioned and adapted within said second reservoir so as to be capable of transferring by way of said conduit means a predetermined amount of second liquid from said second reservoir into said first reservoir, which amount of liquid is directly proportional to the amount of first liquid fed into said first reservoir; and (f) a bottle for maintaining a substantially constant level of said second liquid in said second reservoir wherein said bottle has an outlet in its base and is adapted to float in said mixed liquids in said first reservoir without regard to the amount of said second liquid contained in said bottle and said bottle has a flexible tube from the base of said bottle to the base of said second reservoir which is effective for conveying said second liquid from said bottle to said second reservoir.

3. An apparatus for dispensing and mixing liquids which comprises:

(a) a first reservoir having an outlet and first and second inlets;

(b) a metering device positioned and adapted for feeding a predetermined amount of first liquid from the first inlet into said first reservoir;

(c) means for maintaining a substantially constant level of mixed liquids in said first reservoir;

(d) a second reservoir being connected to said first reservoir by conduit means which terminate in the second inlet in said first reservoir;

(e) a scoop device which operates in response to said metering device wherein said scoop device comprises a plurality of substantially arcuate hollow chambers open at both ends and being connected at one of said ends to said conduit means wherein said conduit means is being carried in a rotatable hub positioned and adapted in said second reservoir so that said hollow arcuate chambers are effective in collecting from said second reservoir a predetermined amount of said second liquid, which amount of liquid is directly proportional to the amount of said first liquid fed into said first reservoir, and conveying said second liquid into said conduit means; and (f) means for maintaining a substantially constant level of said second liquid in said second reservoir.

4. An apparatus according to claim 3 wherein said metering device comprises a wheel mounted within said first reservoir wherein said wheel carries a plurality of containers of uniform capacity which are adapted to trap said first liquid entering through said first inlet which results in the rotation of said wheel and subsequently discharge said first liquid into said first reservoir.

References Cited

UNITED STATES PATENTS

| | | | |
|---|---|---|---|
| 1,372,768 | 3/1921 | Mott | 222—57 X |
| 1,575,433 | 3/1926 | Lichtenthaeler | 222—57 |
| 2,102,584 | 12/1937 | Brown | 222—57 |
| 2,996,222 | 8/1961 | Botkin | 222—67 |
| 3,079,944 | 3/1963 | McLaughlin | 222—547 X |
| 3,181,731 | 5/1965 | Ellis | 222—57 |

FOREIGN PATENTS 220,587  2/1959  Australia.

OTHER REFERENCES

A Pictorial History of Inventions, by Eco et al., 1961.

ROBERT B. REEVES, *Primary Examiner.*

N. L. STACK, *Assistant Examiner.*